F. E. AMTHOR.
COMPENSATING THERMOMETER.
APPLICATION FILED JAN. 15, 1913.
1,165,934.
Patented Dec. 28, 1915.
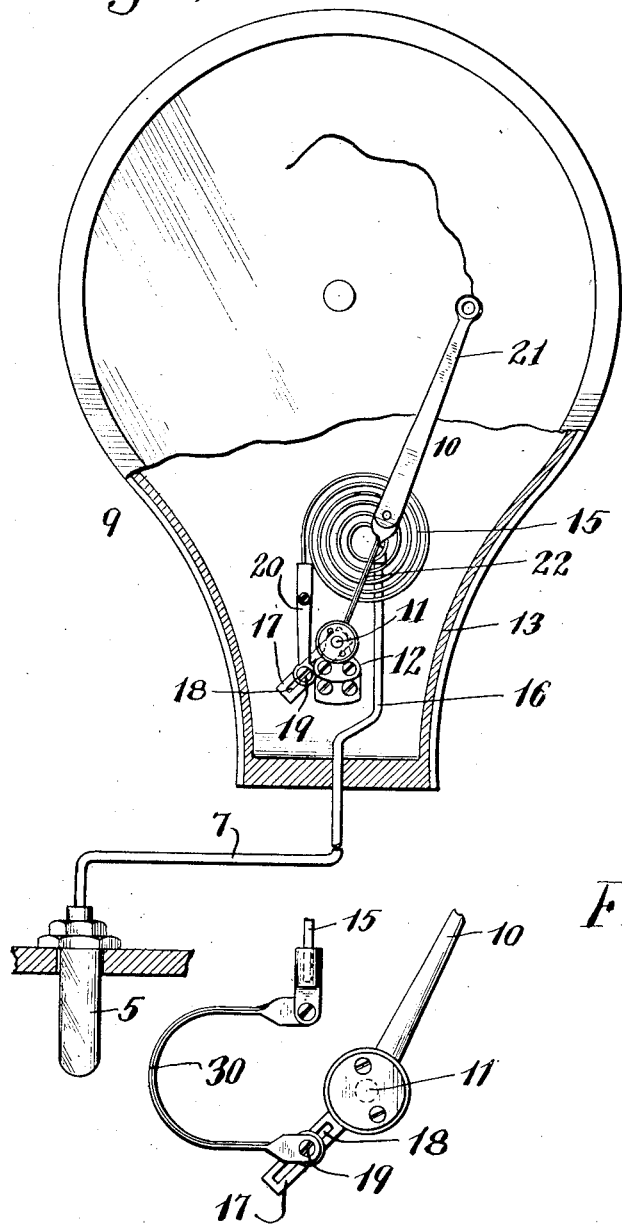
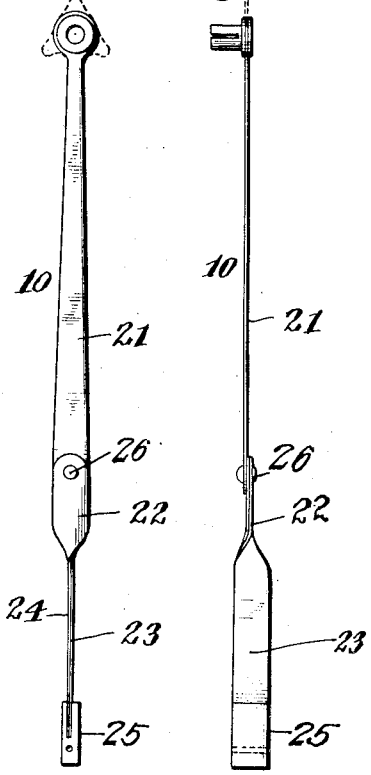
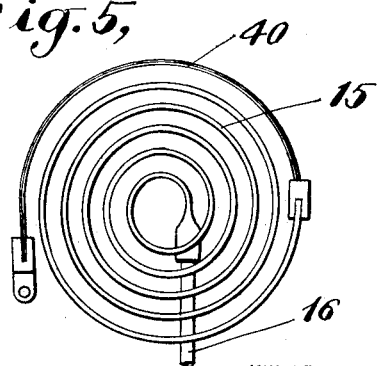

UNITED STATES PATENT OFFICE.

FRITZ E. AMTHOR, OF BROOKLYN, NEW YORK, ASSIGNOR TO THE SCHAEFFER & BUDENBERG MFG. CO., OF BROOKLYN, NEW YORK, A CORPORATION OF NEW YORK.

COMPENSATING THERMOMETER.

1,165,934.  Specification of Letters Patent.  Patented Dec. 28, 1915.

Application filed January 15, 1913. Serial No. 742,087.

*To all whom it may concern:*

Be it known that I, FRITZ E. AMTHOR, a subject of the Emperor of Germany, and a resident of Brooklyn, county of Kings, and State of New York, have invented certain new and useful Improvements in Compensating Thermometers, of which the following is a specification, reference being had to the accompanying drawings, forming a part thereof.

My invention relates to apparatus for measuring temperature and particularly to the gage, or recording element of such an apparatus as embodies a remote actuator, which is directly influenced by the temperature to be measured.

The object of my invention is to provide a simple compact and effective means of compensating for variations of temperature at the gage or recording element whereby the indicating pointer or recording stylus may be unaffected by such variations and accurately respond only to variations in temperature at the remote actuator.

Other objects of my invention will hereinafter appear.

I will describe my invention in the following specification and point out the novel features in appended claims.

Referring to the drawings: Figure 1 is a front elevation of a temperature recording device embodying my invention, the casing being broken away to disclose the interior construction of a portion thereof, together with a remote thermometer actuator. Figs. 2 and 3 are respectively a face view and an edge view on a larger scale of the body of the pointer or stylus shown in Fig. 1. Two different modifications of my invention are shown in Figs. 4 and 5.

Like characters of reference designate corresponding parts in all the figures.

The thermometer as a whole comprises a heat responsive actuating member 5, a transmission member 7 and a gaging member 9, the actuating and the gaging members being remote from each other.

On the gaging member 10, is a pointer which may be adapted to carry a pen or stylus. It is pivoted at 11 on a pin or shaft which is supported by a bracket 12 from a body or casing 13.

A pressure element 15 comprises a flattened tube arranged in the form of a spiral which is connected at its inner end to a stationary tube or pipe 16 which is a part of the transmission element 7. Its outer end is closed and is connected to an arm 17 by a link 20. This arm is attached to the index or pointer near its point of pivot and has a slot 18 which permits an adjustment of the pin 19, by which the link 20 is connected to it.

The pointer is composed of an outer section 21 and an inner thermostatic section 22 which comprises strips 23 and 24 of materials having unlike coefficients of expansion brazed or soldered together and a hub 25. These strips expand and contract unequally under variations of temperature and hence deflect the outer end of the pointer in one direction or the other in response to such variations.

The thermostatic section 22 is twisted through an angle of 90° near the end which is attached to the outer section 21 to which it is attached by a rivet 26. The section 21 is preferably formed of steel or other resilient material so that it tends to press the pencil or stylus against the record card. The single rivet holds the two parts securely in position but at the same time permits a slight adjustment of the outer section 21 relative to the thermostatic section.

While the spiral 15 is purely a pressure element, its temperature and the pull which it exerts upon the arm 17 are of course varied somewhat in response to variations in temperature in its surrounding medium. But the parts are so arranged and the section 22 so designed as to compensate for the action due to temperature variations and hence the position of the marking end of the pointer is a true indication of the temperature at the remote actuator 5 which may of course be very different from the temperature at the pressure element 15.

The relative location of the element 15 and the thermostatic section 22 is important and in my device they are close together and are therefore influenced by corresponding temperature variations.

In the modification of Fig. 4 a U-shaped thermostatic element 30 is interposed between the pressure element 15 and the slotted arm 17, the element 22 being omitted from the pointer 10.

In Fig. 5 an arc-shaped thermostatic member 40 is arranged parallel with the turns of the spiral element 15 and forms a part of it. The spiral element including the thermostatic element is therefore adapted to replace the element 22 of the arrangement shown in Fig. 1.

The thermostatic elements 30 and 40 are similar in construction to the element 22 and are so arranged as to compensate for the temperature variations at the pressure element.

What I claim is:

1. In a pressure gage in combination with an actuating means, an index or pointer adapted to be swung on a pivot by said actuating means and comprising a thermostatic section arranged to automatically distort the pointer to compensate for local temperature variations.

2. In a pressure gage in combination with an actuating means, a pointer adapted to be swung on a pivot by said actuating means and comprising a thermostatic section interposed between the pivot and the index end of the pointer and adapted to automatically distort the pointer to compensate for local temperature variations.

3. A pointer for a temperature gage adapted to be swung on a pivot and comprising a thermostatic section interposed between the pivot and the index end of the pointer and composed of two parallel strips of unlike material united together in a plane at right angles to the plane of pointer movement.

4. A pointer for a temperature gage adapted to be swung on a pivot and comprising a thermostatic section, a flat resilient index section in the plane of movement of the pointer, and a thermostatic section interposed between the flat index section and a pivot and composed of two parallel strips of unlike material united together and twisted near the point of connection with the index section into a plane at right angles thereto.

In witness whereof, I have hereunto set my hand this 14 day of January 1913.

FRITZ E. AMTHOR.

Witnesses:
T. J. MENTEN,
ERNEST W. MARSHALL.